April 18, 1967      G. A. DU ROCHER      3,315,227
VEHICLE SIGNAL SYSTEM
Filed Oct. 14, 1964
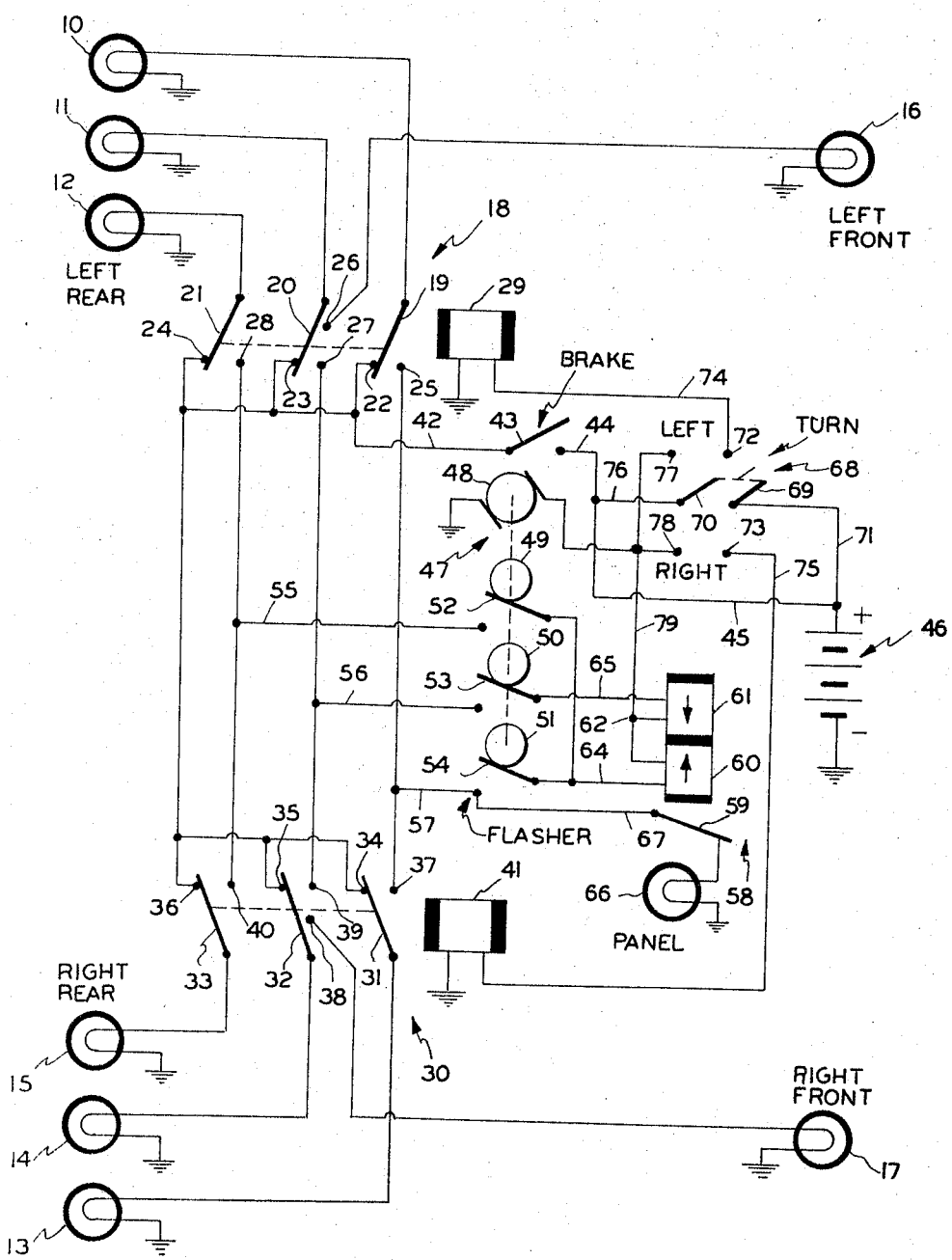
INVENTOR
GIDEON A. DuROCHER
BY    *Robert D. Sommer*
AGENT

3,315,227
VEHICLE SIGNAL SYSTEM

Gideon A. Du Rocher, Mount Clemens, Mich., assignor to Essex Wire Corporation, Fort Wayne, Ind., a corporation of Michigan
Filed Oct. 14, 1964, Ser. No. 403,716
6 Claims. (Cl. 340—82)

This invention relates to directional signal system for automotive vehicles and particularly to lamp failure indicating circuits in directional signal systems of the type in which plurality of signal lamps are sequentially energized.

Most vehicle directional signal systems utilize pilot or indicator lamps connected in parallel with the directional signal lamps to indicate malfunction of the signal systems. In such systems the flashing of the signal lamps is controlled by a thermal flasher switch which has a flashing rate sensitive to the current taken by the signal lamps. The failure of a signal lamp is thus indicated by a variation in the flashing rate of the pilot or indicator lamp.

The above described indicator lamp circuit system obviously cannot be utilized in directional signal systems where a plurality of signal lamps are sequentially energized by a motor driven flasher switch. Other known forms of indicator lamp circuits are ineffective or impractical for use in the latter type of signal systems because of the large number of signal lamps and the large current variations with sequential energization of the signal lamps.

It is therefore an object of this invention to provide an improved directional signal system for motor vehicles.

It is another object of this invention to provide a directional signal system of the type having a plurality of sequentially energized signal lamps which includes a simple, effective and reliable indicator circuit for visually indicating the failure of any signal lamp.

In accordance with the invention there is provided a lamp failure indicating circuit for use in a vehicle directional signal system having right and left rear sets of three signal lamps each and single right and left front signal lamps. The right signal lamps and the left signal lamps are connected to respective contacts of right and left directional relays which are selectively energized by a manually operated directional signal switch. Normally closed contacts of the relay connect the rear lamps to a vehicle power source through a brake signal circuit which includes a normally open brake switch that is closed when the foot brake pedal is operated. Normally open contacts of the relay connect the signal lamps to three flasher switches which are sequentially closed and simultaneously opened during each flasher cycle. According to a feature of this invention a first energizing circuit for a first lamp of each rear lamp set includes the respective normally open relay contacts and the first flasher switch, a second energizing circuit for the front lamps and a second lamp of each rear lamp set includes the respective normally open relay contacts and the second flasher switch, and the third energizing circuit for a third lamp of each rear set includes the respective normally open relay contacts and the third flasher switch. The first and third energizing circuits are connected to the power source through a first current responsive coil of a differential relay while the second energizing circuit is connected to the power source through a second current responsive coil of the differential relay. The coils of the differential relay are connected in magnetic opposition and act to open a normally closed switch of the differential relay only when there is a substantial unbalance in the currents flowing through the relay coils. An indicator panel lamp is connected by the differential relay switch to the third energizing circuit. As the currents of two signal lamps flow through each of the coils of the differential relay upon the closing of the third flasher switch when the directional signal switch is operated, the coil currents are balanced and the indicator lamp is energized each time the third flasher switch closes. However, if any one of the signal lamps fails the resulting unbalanced currents through the coils of the differential relay open the differential relay switch and the panel indicator lamp is unenergized thus indicating that a signal lamp has failed.

These and other features of the invention will be more fully understood from the following description read in connection with the accompanying drawing in which:

The single figure is an electrical schematic diagram illustrating a directional signal system incorporating the lamp failure indicating arrangement of the present invention.

In the embodiment illustrated in the drawing the signal lamps are shown in plan in their relative positions as they would occupy in a vehicle, the front of which would be at the right side of the figure. One set of directional signal lamps 10, 11 and 12 are positioned horizontally in line near the left rear corner of the vehicle while another set of directional signal lamps 13, 14 and 15 are similarly positioned horizontally in line near the right rear corner of the vehicle. The signal lamps 10, 11, 12, 13, 14 and 15 also function as stop signal lamps and preferably are provided with red lens. A left front directional signal lamp 16 and right front directional signal lamp 17 are positioned in the front end of the vehicle and preferably provided with yellow or white lens. The signal lamps preferably are of equal candle power and require equal energizing currents. One terminal of each of these signal lamps is grounded.

A left directional relay 18 has three movable contacts 19, 20 and 21 connected to the left rear signal lamps 10, 11 and 12 respectively. The movable contacts 19, 20 and 21 are spring-biased into engagement with stationary contacts 22, 23 and 24 respectively and are pulled into engagement with the stationary contacts 25, stationary double make contacts 26 and 27, and stationary contact 28 respectively when the relay coil 29 is energized. The stationary contact 26 is connected to the left front signal lamp 16. A right directional relay 30 is connected in like manner to the right signal lamps. The relay 30 has three movable contacts 31, 32 and 33 connected to the right rear signal lamps 13, 14 and 15 respectively, and spring-biased into engagement with the stationary contacts 34, 35 and 36 respectively. The movable contacts 31, 32 and 33 are pulled into engagement with the stationary contacts 37, stationary double-make contacts 38 and 39, and stationary contact 40 respectively when the relay coil 41 is energized. The stationary contact 38 is connected to the right front signal lamp 17.

The stationary contacts 22, 23 and 24 of the relay 18 and the stationary contacts 34, 35 and 36 of the relay 30 are each connected to a conductor 42 leading to one terminal of a brake switch 43 which is normally open and which is closed when the foot brake pedal (not shown) of the vehicle is depressed by the vehicle operator. The other terminal of the brake switch 43 is connected by the conductors 44 and 45 to a suitable power source such as the vehicle storage battery 46.

The stationary contacts 25, 27 and 28 of the relay 18 and the stationary contacts 37, 39 and 40 of the relay 30 are connected to a flasher device 47. The flasher device 47 is shown as a motor driven sequence control or timer switch consisting of an electric motor 48 driving three cams 49, 50 and 51 which respectively operate three cam switches 52, 53 and 54 in a predetermined sequence. Obviously, the three cam switches may be operated by a single cam or other sequence controls of well known construction may be utilized. The cams 49,

50 and 51 are suitably shaped to successively close the cam switches 52, 53 and 54 respectively and to simultaneously open the three switches during each cycle of the flasher device. The flasher device 47 preferably has a cycling rate of 60 to 120 cycles per minute with the cam switches 52, 53 and 54 being closed 25, 50 and 75 percent respectively of each cycle. One terminal of the cam switch 52 is connected by the conductor 55 to the stationary contact 28 of the relay 18 and the stationary contact 40 of the relay 30. Similarly one terminal of the cam switch 53 is connected by the conductor 56 to the relay stationary contacts 27 and 39, and one terminal of the cam switch 54 is connected by the conductor 57 to the relay stationary contacts 25 and 37.

The other terminals of the cam switches are connected to the battery 46 through the coils of a differential relay 58. The relay 58 has a normally closed switch 59 actuated by two magnetically opposed, current responsive coils 60 and 61 of low resistance which have a common terminal 62. The other end of the coil 60 is connected by the conductor 64 to the cam switches 52 and 54 while the other end of the coil 61 is connected by the conductor 65 to the cam switch 53. With balanced or equal currents through the coils 60 and 61 the equal and opposing magnetic fields of the coils cancel so as to permit the relay switch 59 to remain closed. On the other hand a substantial difference in the current through the coils 60 and 61 will produce a magnetic effect which will open the relay switch 59. An indicator lamp 66 which may be mounted on the instrument panel of the vehicle has one side of its filament connected to ground and the other side connected by the conductor 67 and the relay switch 59 to the cam switch 54.

The energization of the flasher device 47 and the relay coils 29 and 41 is controlled by a turn or directional signal switch 68. The switch 68 is illustrated as a simple double pole double throw switch having two movable contacts 69 and 70 manually movable in unison between a neutral position and two selectively settable positions. However, it will be understood that other well known types of directional signal switches including those of the type automatically reset to neutral position by a completed turn may be utilized in connection with the present invention. The movable contact 69 is connected by the conductor 71 to the battery 46 and engages either of a pair of stationary contacts 72 and 73 upon movement from its central neutral position. The contacts 72 and 73 are connected respectively by the conductor 74 to the relay coil 29 and by the conductor 75 to the relay coil 41. The movable contact 70 is connected by the conductors 76 and 45 to the battery 46 and engages either of a pair of stationary contacts 77 and 78 upon movement from its central neutral position. Both contacts 77 and 78 are connected to the motor 48 of the flasher device 47 and are connected to the coils 60 and 61 of the differential relay 58 by the conductor 79.

The operation of the signal system shown in the figure will now be described. Normally the brake switch 43 and the directional signal switch 68 are open and the motor 48 and the relay coils 29 and 41 are not energized. Under these conditions the movable contacts of the relays 18 and 30 will be in the position shown in the figure. If the brakes are operated the switch 43 is closed completing a circuit from the battery 46 through the conductors 45 and 44, brake switch 43, conductor 42, the normally closed relay contacts 22 and 19, and the left rear signal lamp 10 to ground. Similarly the other left rear signal lamps 11 and 12 are energized through the other normally closed contacts of the relay 18 while at the same time the right rear signal lamps 13, 14 and 15 are energized through the normally closed contacts of the relay 30. Thus all six rear signal lamps are simultaneously energized as brake or stop lamps.

To signal a left turn the directional signal switch 68 is moved to its "left" position with the contact 69 engaging the contact 72 and the contact 70 engaging the contact 77. When this is done a circuit is completed from the battery 46 through the conductor 71, contacts 69 and 72, conductor 74 and the relay coil 29 to ground, thus energizing the relay 18 and moving the movable contacts from engagement with the normally closed stationary contacts into engagement with their normally open stationary contacts. This interrupts the brake signal circuit from the brake switch 43 to the left rear signal lamps 10, 11 and 12. At the same time the contacts of the relay 18 connect the left rear signal lamps and the left front signal lamp in three lamp energizing circuits each including one of the cam switches and one of the coils of the differential relay 58. These lamp energizing circuits are each connected to the battery 46 through the contacts 70 and 77 of the directional signal switch 68 and the conductors 76 and 45. The first circuit extends from the contact 77 through the conductor 79, coil 60 of the differential relay 58, conductor 64, cam switch 52, conductor 55, contacts 28 and 21 of the left directional relay 18, and signal lamp 12 to ground. The second circuit extends from the contact 77 through the conductor 79, coil 61, conductor 65, cam switch 53, conductor 56, relay contacts 27 and 20, and two parallel branches, one including the signal lamp 11 to ground, the other including the relay contact 26 and the signal lamp 16 to ground. The third energizing circuit extends from the contact 77 through the conductor 79, coil 60, conductor 64, cam switch 54, conductor 57, relay contacts 25 and 19, and signal lamp 10 to ground.

The engagement of the contacts 70 and 77 of the directional signal switch also completes a circuit from the battery 46 through the conductors 45 and 76, switch contacts 70 and 77 and the motor 48 of the flasher device 47 to ground. This energizes the motor 48 and as it rotates its cams 49, 50 and 51 the cam switches 52, 53 and 54 are successively closed to complete the above mentioned three lamp energizing circuits in turn. Thus the signal lamp 12 is first energized through the cam switch 52, the signal lamps 11 and 16 are next energized through the cam switch 53 and finally the signal lamp 10 is energized through the cam switch 54. At this time all the left signal lamps are energized. As the rotation of the cams continues all three cam switches are simultaneously opened to de-energize all left lamps. This cycle of operation is repeated with each complete revolution of the flasher device cams. The consecutive flashing of the left rear lamps with each remaining lit until the end of the cycle gives a rear light signal flowing to the left. At the same time a conventional flashing signal is given by the left front signal lamp 16 as the cam switch 53 closes and opens. The flashing of the left signal lamps continues until the directional signal switch 68 is returned to its neutral position.

If all the left signal lamps are operating the indicator lamp 66 is energized simultaneously with the signal lamp 10 when the cam switch 54 closes thus indicating normal operation of the directional signal switch system. The indicator lamps 66 is energized through a circuit from the battery 46 which includes the conductors 45 and 76, contacts 70 and 77 of the directional signal switch 78, conductor 79, coil 60 of the differential relay 58, conductor 64, cam switch 54, conductor 67, relay switch 59 and the indicator lamp 66 to ground. With all the signal lamps in good condition the currents flowing through the coils 60 and 61 of the differential relay 58 are substantially equal when the cam switch 54 closes. The energizing currents of the signal lamps 10 and 12 flow through the coil 60 are equal to the energizing currents of the signal lamps 11 and 16 which flow through the coil 61. The additional current drawn by the indicator lamp 66 through the coil 60 is small compared to that of the signal lamps and is insufficient to produce a magnetic effect capable of opening the relay switch. However, if any one of the left signal lamps burn out the current flow in one of the relay coils 60 and 61 is approximately one-half that in the other. This differential in coil currents produces a magnetic effect which will open the relay switch 59 and thus interrupt the energizing circuit of the indicator lamp 66. The indicator lamp 66 by its remaining dark when the directional signal switch has been operated indicates to the vehicle operator that a signal lamp has burned out. It should be noted that although the currents to the relay coils 60 and 61 may be balanced prior to the closing of the cam switch 54 due to a failure of signal lamps 11 or 16, this is of no consequence since the indicator lamp 66 cannot be energized until the cam switch 54 closes.

To signal a right turn the directional signal switch 68 is moved to its left position. In this position the relay coil 41 would be energized. It will be understood that the operation of the flasher device 47, the differential relay 58, the right signal lamps 13, 14, 15 and 17 and the indicator lamp 66 is identical to that just described.

It will be apparent that the two relays 18 and 30 may be constructed as a single simply assembly of the character disclosed in United States Patent Number 2,892,053, issued June 23, 1959, to Cecil A. Lambert and George L. Webb. It will also be apparent that the two relays 18 and 30 could be eliminated by providing the turn signal switch 68 with additional contacts corresponding to those of the two relays. Other obvious modifications in the arrangement of the parts and connections of the disclosed vehicle signal system may be made without departing from the spirit and scope of the present invention as defined in the appended claims.

What is claimed is:
1. A vehicle signal system comprising, in combination:
 (a) a plurality of signal lamps each of equal candle power including a left front signal lamp, a right front signal lamp, a left rear set of three signal lamps, and a right rear set of three signal lamps;
 (b) a source of electrical power for said lamps;
 (c) a flasher device for effecting periodic energization of said lamps from said source, said flasher device comprising first, second and third flasher switches and operating means for repeatedly opening and closing said flasher switches, said first, second and third flasher switches being successively closed in said order and simultaneously opened by said operating means;
 (d) a differential relay having first and second magnetically-opposed, current-responsive coils and a normally closed relay switch adapted to be opened in response to a predetermined difference in the currents flowing through said first and second coils;
 (e) a first energizing circuit connected to said source and including said first flasher switch and said first relay coil in series;
 (f) a second energizing circuit connected to said source and including said second flasher switch and said second relay coil in series;
 (g) a third energizing circuit connected to said source and including said third flasher switch and said first relay coil in series;
 (h) right and left directional signal switch means each having a normal position and an operated position, said directional signal switch means each having three normally open contact means;
 (i) signal contral means for selectively operating either of said directional signal switch means to determine the lamps to be energized;
 (j) a first signal lamp of said left rear set being connected by a first one of said normally open contact means of said left directional signal switch means in series with said first energizing circuit; a second signal lamp of said left rear set and said left front signal lamp each being connected by a second one of said normally open contact means of said left directional signal switch means in series with said second energizing circuit; the third signal lamp of said left rear set being connected by a third one of said normally open contact means of said left directional signal switch means in series with said third energizing circuit;
 (k) a first signal lamp of said right rear set being connected by a first one of said normally open contact means of said right directional signal switch means in series with said first energizing circuit; a second signal lamp of said right rear set and said right front signal lamp each being connected by a second one of said normally open contact means of said right directional signal switch means in series with said second energizing circuit; the third signal lamp of said right rear set being connected by a third one of said normally open contact means of said right directional signal switch means in series with said third energizing circuit;
 (l) and an indicator lamp connected by said relay switch to said third energization circuit for energization from said source.

2. A vehicle signal system according to claim 1 wherein said right and left directional signal switch means are each provided with three normally closed contact means, said vehicle signal system further comprising:
 (a) a normally open brake switch closed responsive to operation of the vehicle brakes;
 (b) a fourth energizing circuit connected to said source and including said brake switch;
 (c) means including said normally closed contact means of said left directional signal switch means connecting each lamp of said left rear set in series with said fourth energizing circuit;
 (d) and means including said normally closed contact means of said right directional signal switch means connecting each lamp of said right rear set in series with said fourth energizing circuit.

3. A vehicle signal system comprising, in combination:
 (a) a plurality of signal lamps each of equal candle power including a left front signal lamp, a right front signal lamp, a left rear set of three signal lamps and a right rear set of three signal lamps;
 (b) a source of electrical power for said lamps;
 (c) a flasher device for effecting periodic energization of said lamps from said source, said flasher device comprising first, second and third flasher switches and operating means for repeatedly opening and closing said flasher switches, said first, second and third flasher switches being successively closed in said order and simultaneously opened by said operating means;
 (d) a differential relay having first and second magnetically-opposed, current-responsive coils and a normally closed relay switch adapted to be opened in response to a predetermined difference in the current flowing through said first and second coils;
 (e) a first energizing circuit connected to said source and including said first flasher switch and said first relay coil in series;
 (f) a second energizing circuit connected to said source and including said second flasher switch and said second relay coil in series;
 (g) a third energizing circuit connected to said source and including said third flasher switch and said first relay coil in series;
 (h) a normally open brake switch closed responsive to operation of the vehicle brakes;
 (i) a fourth energizing circuit connected to said source and including said brake switch;
 (j) right and left directional signal relays each having three normally closed contacts means, three normally open contact means and a coil which, when energized, will open said normally closed contact means and close said normally open contact means;
 (k) a directional signal circuit including an operator controlled directional signal switch having contact means connected between said source and the coils of said directional signal relays for selectively energizing the coils of said directional signal relays;

(l) means including said normally closed contact means of said left directional relay connecting each lamp of said left rear set in series with said fourth energizing circuit;

(m) means including said normally closed contact means of said right directional relay connecting each lamp of said right rear set in series with said fourth energizing circuit;

(n) a first signal lamp of said left rear set being connected by a first one of said normally open contact means of said left directional relay in series with said first energizing circuit; a second signal lamp of said left rear set and said left front signal lamp each being connected by a second one of said normally open contact means of said left directional relay in series with said second energizing circuit; the third signal lamp of said left rear set being connected by a third one of said normally open contact means of said left directional relay in series with said third energizing circuit;

(o) a first signal lamp of said right rear set being connected by a first one of said normally open contact means of said right directional relay in series with said first energizing circuit; a second signal lamp of said right rear set and said right front signal lamp each being connected by a second one of said normally open contact means of said right directional relay in series with said second energizing circuit; the third signal lamp of said right rear set being connected by a third one of said normally open contact means of said right directional relay in series with said third energizing circuit;

(p) and an indicator lamp connected by said relay switch to said third energizing circuit for energization from said source.

4. A vehicle signal system according to claim 3 wherein said flasher device has a cycling rate of 60 to 120 cycles per minute and said first, second and third flasher switches are closed during approximately one-fourth, one-half and three-fourths, respectively, of each cycle of said flasher device.

5. A vehicle signal system according to claim 3 wherein said operating means of said flasher device comprises cam means for actuating said flasher switches and an electric motor for driving said cam means.

6. A vehicle signal system according to claim 5 wherein said directional signal switch includes additional contact means connected between said source and said electric motor for energizing said motor when said directional signal switch is operated to energize either coil of said right and left directional relays.

References Cited by the Examiner
UNITED STATES PATENTS 3,041,579 6/1962 Kanzenbach _____ 340—82
3,250,950 5/1966 Reiche _____ 340—80 X NEIL C. READ, *Primary Examiner.*

I. J. LEVIN, *Assistant Examiner.*